United States Patent [19]
Ziegler, Jr.

[11] Patent Number: 4,994,792
[45] Date of Patent: Feb. 19, 1991

[54] FLUID TEMPERATURE MONITORING SYSTEM

[76] Inventor: Eldon W. Ziegler, Jr., 10092 Hatbrim Ter., Columbia, Md. 21046

[21] Appl. No.: 446,685

[22] Filed: Dec. 6, 1989

[51] Int. Cl.⁵ .............................................. G08B 17/00
[52] U.S. Cl. .................................. 340/584; 340/586; 340/596; 340/661; 340/691; 374/147
[58] Field of Search ............... 340/584, 586, 596, 691, 340/693, 661; 374/147-148

[56]      References Cited
       U.S. PATENT DOCUMENTS

| | | | |
|---|---|---|---|
| 2,916,915 | 12/1959 | Burgert | 340/586 X |
| 3,582,921 | 6/1971 | Krieger | 340/596 X |
| 3,952,594 | 4/1976 | McMahan | 374/147 |
| 4,050,308 | 9/1977 | Lee | 340/596 X |
| 4,752,770 | 6/1988 | St. Pierre | 340/596 |

FOREIGN PATENT DOCUMENTS 0073017  4/1986  Japan ..................... 340/586

*Primary Examiner*—Glen R. Swann, III
*Assistant Examiner*—Thomas J. Mullen, Jr.
*Attorney, Agent, or Firm*—Laubscher Presta & Laubscher

[57]           ABSTRACT

A fluid temperature monitoring system is characterized by an adjustable variable voltage divider for selecting a desired temperature range, a temperature detector for detecting whether the fluid temperature is above, below, or at the desired range, and a temperature indicator for emitting three different temperature indicating signals in accordance with temperatures above, below, or at the desired temperature range.

24 Claims, 4 Drawing Sheets

FLUID TEMPERATURE MONITORING SYSTEM

BACKGROUND AND SUMMARY OF THE INVENTION

The present invention is related to a temperature monitoring system, especially for monitoring fluid temperatures, such as the water temperature of water exiting from a faucet in a sink or shower or the like.

Prior art temperature monitors utilize meters with a moving indicator or digital numeric displays of the temperature being measured Such temperature monitors are rather expensive to make and difficult to read, especially in certain practical use environments. For example, such prior art temperature monitors have not been widely adopted for in-home use or personal use to measure water temperature of water flowing from a faucet into a sink or bath or shower. Difficulty in reading the values displayed on such prior art temperature monitors is a particularly bothersome problem for people requiring eye glasses because when preparing to shower or shave they oftentimes have their glasses removed.

For persons who travel extensively staying in different motels and hotels, it is a particularly bothersome problem to be forced to test the water temperature by inserting a hand or foot into the water and experience discomfort if the water is too cold and discomfort and possibly burns when the hot water finally arrives.

Another problem with prior art temperature monitors that are intended to be portable and include a battery for supplying operating electrical current is that accuracy is lost when the supply voltage changes, such as when the battery is drained.

The present invention is directed toward providing a temperature monitor which overcomes the above-mentioned disadvantages of the prior art.

According to one aspect of the present invention, the problems related to battery drain are solved by providing a temperature monitor system which has an accuracy which is insensitive to reductions in the power supply voltage so long as the supply voltage is above a minimum operating range.

According to another aspect of the invention, the problems related to readability of the temperature indicator are solved by providing a temperature monitoring system with a small red, green, and yellow light indicator.

According to another aspect of preferred embodiments of the invention, the problems related to portability and economy of manufacture to facilitate widespread personal use, even for travelers, are solved by providing a compact hand holdable construction with a minimum of circuit components.

According to certain preferred embodiments of the present invention temperature monitoring arrangement is provided with the following combination of features:
(a) desired temperature selection means for selecting a desired temperature for a fluid medium,
(b) temperature detecting means for detecting whether the fluid medium temperature is above, below or at the desired temperature,
(c) and temperature indicating means for emitting three different temperature indicating signals indicating whether the fluid temperature is respectively above below or at the desired temperature,
(d) wherein the temperature detecting and indicating means include electrical circuit means with a supply voltage, said electrical circuit means assuring accurate temperature detecting and indicating irrespective of the supply voltage level as long as said supply voltage is above a predetermined minimum voltage level.

In certain especially preferred embodiments of the invention, the temperature monitoring system is designed to be a hand-held, self-contained compact unit, which is easily transportable and operates on low voltage batteries such as a common 9 volt battery.

In certain other preferred embodiments of the invention, the temperature monitoring system is manufactured together with a plumbing fixture, such as a water faucet fixture, such that the system can be incorporated under factory conditions and marketed as intergral faucet/temperature indicating system units.

In other preferred embodiments of the invention, the temperature monitoring system is designed to be detachably mounted to the exterior of an existing plumbing fixture such as a water faucet, with a clamping bracket being provided for such a purpose. With this construction, the temperature monitoring system can be marketed separately from the plumbing fixture, but fixed in place as retrofit construction on existing in situ faucets.

In certain preferred embodiments of the invention, the temperature indicating means includes different color light signals to depict the respective fluid medium temperature conditions as above, below, or at a desired predetermined temperature range. In this manner, a very simple easy to read monitor is provided that can be used by persons with poor vision because of removal of their glasses. This easy to read monitor is advantageous even for people with perfect eyesight, for use in environments such as a shower or bathroom, where steam and the like further restricts vision. In especially preferred embodiments, the color signals are red, green and yellow, indicating with red that it is too hot, with green that it is within the desired temperature range, and with yellow when it is below the desired temperature range.

In certain preferred embodiments, the temperature indicating light signal is provided by way of light emitting diodes powered by the circuit of the temperature monitoring system. In certain preferred embodiments, three separate light emitting diodes of the three colors are utilized. In other preferred embodiments of the invention, only two light emitting diodes are provided, with red and green colors, a combination of the intensity of these colors being operable to create the third yellow indicating signal.

In especially preferred embodiments, the circuit for the temperature monitor includes a minimum number of elements, thereby improving reliability, while providing for a very economical compact construction.

In certain preferred embodiments, the indicators are automatically deactivated whenever the detected temperature falls below a predetermined level. This construction preserves the power source without requiring a manuel deactivation of the system.

Other objects, advantages and novel features of the present invention will become apparent from the following detailed description of the invention when considered in conjunction with the accompanying drawings.

DETAILED DESCRIPTION OF THE DRAWINGS

Figure 1:
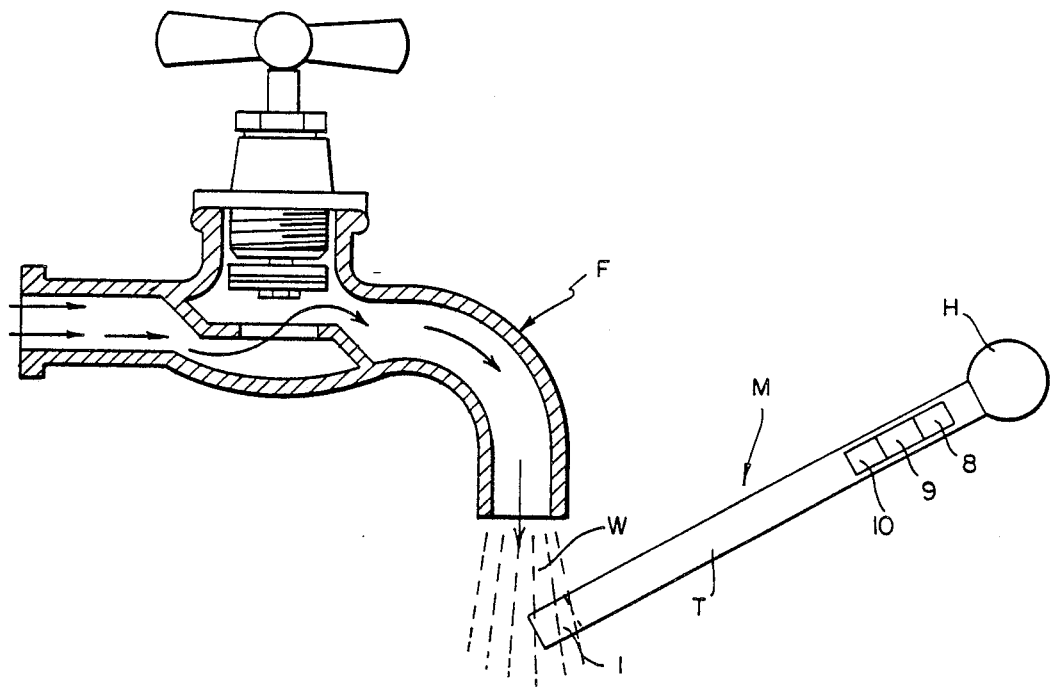
FIG. 1 schematically depicts utilization of a temperature monitoring system constructed according to a preferred embodiment of the present invention.

Referring to FIG. 1, a water faucet F is schematically depicted with a stream of water W flowing therefrom. The monitor M constructed according to the present invention includes a manually graspable handle H connected to a support tube T with a temperature sensor 1 at the end thereof disposable in the water stream W. A readily visible indicator of the temperature condition is provided in the support tube T, including a red indicator light 8, a green indicator light 9, and a yellow indicator light 10. To use the temperature monitor M, a person need simply grasp the handle H, activate the monitor M by turning on an on-off switch and inserting the temperature sensor 1 in the flow of water. The temperature condition of the water will be indicated by the red, green and Yellow lights, reflecting undesirably hot water with a red light signal, undesirably cold water with a yellow signal and acceptable temperature water with a green signal. The color light indicators are easily visible to the person using the monitor M, even if they have poor vision and do not have their glasses, and even if there is fog or steam in the local environment due to the temperature differences in the water and the faucet and/or surrounding air and bathtub or sink structure.

In especially preferred embodiments, the handle H of the monitor M is designed so that the operator squeezing the handle activates the monitor circuit, with an automatic turn-off of the circuit when the handle is released to protect against battery drain.

In other preferred embodiments, the monitoring arrangement includes an automatic shut-off of the indicators whenever the indicated temperature falls below a predetermined level. This preserves battery power without requiring manual release. Certain preferred embodiments for use with water faucets provide for deactivation of the indicators whenever the detected temperature is 15° F. below the desired temperature range of the water, a situation that would normally prevail at room temperature with no water flowing past the sensor.

Figure 2:
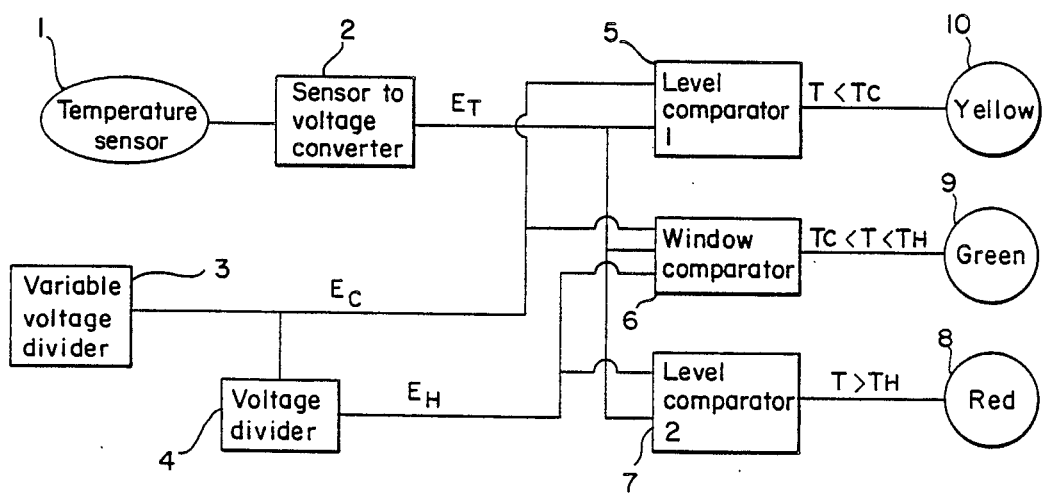
FIG. 2 is a block diagram depicting a preferred embodiment of the temperature monitor of FIG. 1, utilizing three indicators.

Referring to FIG. 2, the monitor M includes the temperature sensor 1 which is connected to voltage converter 2 which converts the sensed temperature to a voltage $E_T$ that either is monotonically increasing or decreasing with temperature over the range being monitored. $E_T$ is not required to be linear with temperature so that a very simple voltage converter can be utilized.

The direction with which $E_T$ changes as the temperature changes depends on the temperature coefficient of the sensor and sensor to voltage converter. A preferred implementation of the invention uses a low-cost thermistor with a negative temperature coefficient The following description of the preferred embodiments of the invention will presume a negative temperature coefficient for the voltage converter 2. It should be understood that those skilled in the art could utilize the description of this application to adapt the logic very simply for a sensor with a positive temperature coefficient.

A variable voltage divider 3 is adjustable by the user to produce a reference voltage $E_C$ which corresponds to a value of $E_T$ at the low temperature end of a predetermined desired temperature range. $E_T$ and $E_C$ are caused to be directly proportional to the supply voltage $E_S$. A second voltage divider 4, either fixed or variable, selects a proportion of $E_C$ as the high temperature end of the desired temperature range, denoted $E_H$.

With this arrangement of FIG. 2, three voltages are being generated:

(i) $E_T$ which represents the temperature measured by the sensor;
(ii) $E_C$ that represents the low temperature end of a predetermined desired temperature range; and
(iii) $E_H$ that represents the high temperature end of the predetermined desired temperature range.

These three voltages are directly proportional to the supply voltage $E_S$ but need not necessarily be linear with temperature; they need only be monotonically decreasing with the temperature.

A level comparator 5 compares $E_T$ and $E_C$ to produce a "TRUE" output whenever the temperature being monitored is less than the low end of the desired temperature range. The yellow indicator 10 is illuminated when the output of level comparator 5 is TRUE.

Window comparator 6 compares $E_T$ to $E_C$ and $E_H$ to produce a TRUE output whenever the temperature being monitored is between the low end and the high end of the desired temperature range selected The green indicator 9 is illuminated when the output of level comparator 6 is TRUE.

Level comparator 7 compares $E_T$ and $E_H$ to produce a TRUE output whenever the temperature being monitored is greater than the high end of the desired temperature range selected The red indicator 8 is illuminated when the output of level comparator 7 is TRUE.

The principles depicted in FIGS. 1 and 2 can be implemented in a practical embodiment with a very small number of components. One op-amp and three resistors can provide the sensor to voltage converter 2. A quad comparator IC can provide one comparator each for level comparator 5 and level comparator 7 and two comparators for the window comparator 6. Since the output of a window comparator made from two comparators has a low level output when the input voltage is within the window, an inverter is used to turn on the indicator. The inverter can be provided by a transistor, one-half of a dual op-amp or other means. One LED, each of the appropriate color with current limiting resistor can provide the indicators.

Figure 3:
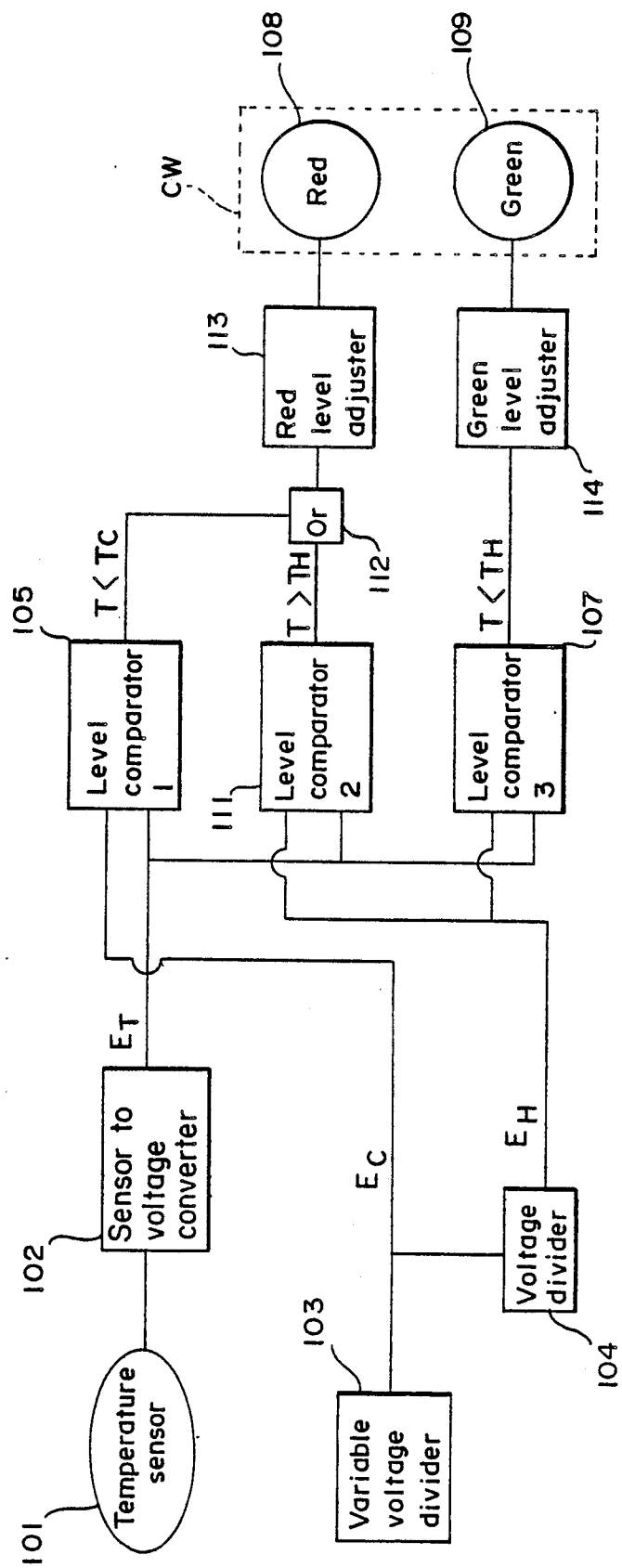
FIG. 3 is a block diagram depicting a temperature monitoring system constructed according to a second preferred embodiment of the present invention, utilizing two indicators in a single physical package.
Figure 4:
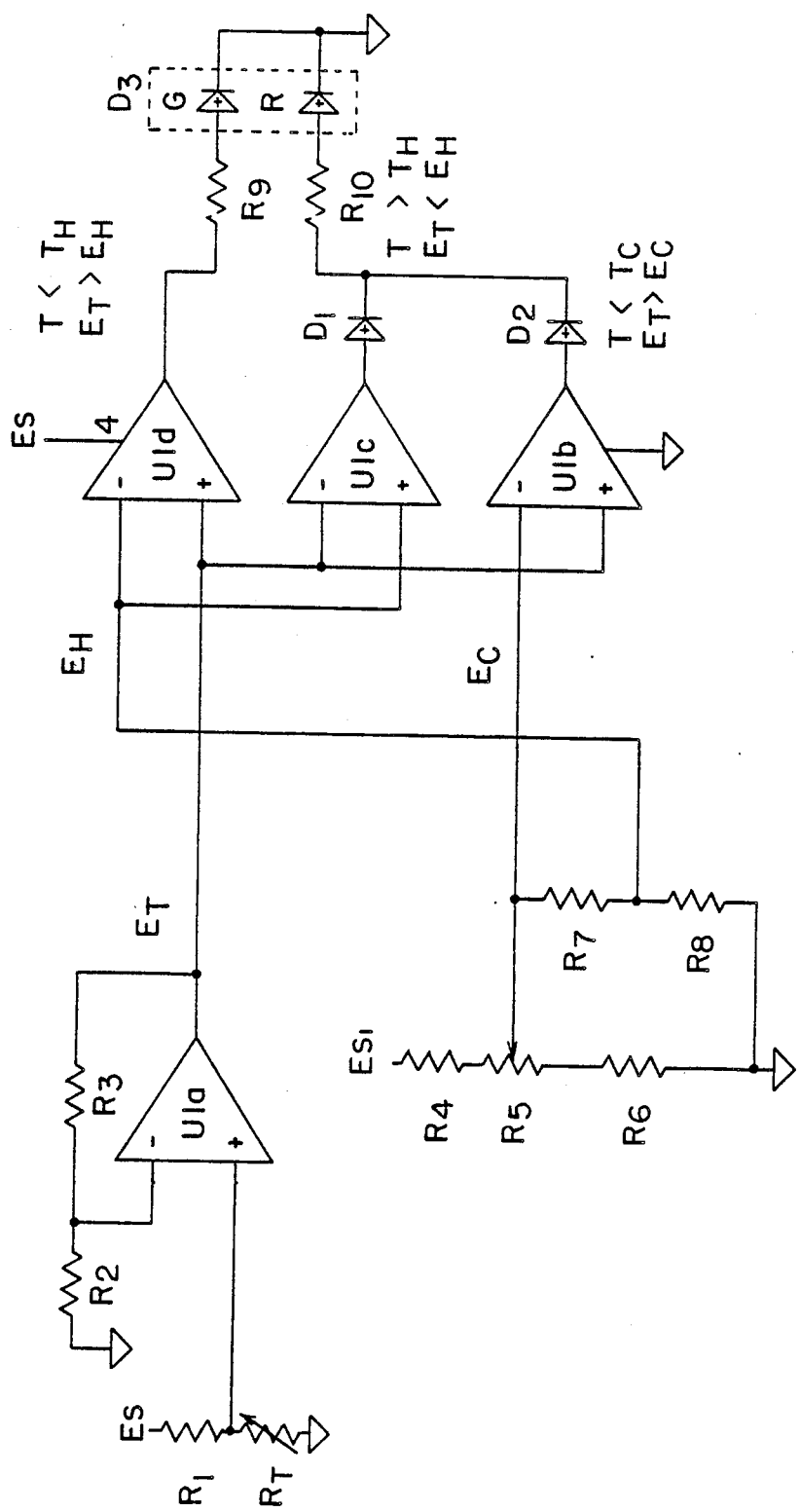
FIG. 4 is a schematic circuit diagram of a temperature monitoring system constructed according to the embodiment of FIG. 3.

FIGS. 3 and 4 illustrate a second preferred embodiment of the invention which has even fewer components then that of FIGS. 1 and 2. The embodiment of FIGS. 3 and 4 can also be incorporated into a manually held monitor M, such as depicted in FIG. 1, the difference being that two light indicators rather than three are provided. In the embodiments of FIGS. 3 and 4, a red LED 108 and a green LED 109 are provided as the indicators and are mounted in a common container window CW which results in yellow being produced when both red and green are illuminated in the proper proportion. This configuration eliminates the separate yellow indicator LED and replaces the window comparator, and thus its dual comparators and inverter, by a single level comparator and an "OR" function device 112. In FIG. 3, the temperature sensor 101 is connected to sensor to voltage converter 102, having an output $E_T$ supplied to each of level comparators 105, 107, and 111. The variable voltage divider 103 and voltage divider 104 provide output voltage signals $E_C$ and $E_H$ corresponding to those described above for the variable voltage divider 3 and voltage divider 4 of the FIG. 2 embodiment, the signal $E_C$ being fed to level comparator 105 and the signal $E_H$ being fed to both level comparators 107 and 111.

The outputs of level comparators 105 and 111 are "OR-ed" together in "OR" function device 112 and adjusted and leveled by red level adjuster 113 to illuminate the red indicator diode 108. Level comparator 107 illuminates the green indicator 109 via the green level adjuster 114. Now the red indicator alone is illuminated when the temperature is above the high end of the predetermined range; the green indicator alone is illuminated when the temperature is below the high end of the range and above the low end of the range; and both indicators are illuminated when the temperature is below the low end of the range to produce yellow. The op-amp in the sensor to voltage converter 102 and the three level comparators 105, 107, and 111 can be provided by a single quad op-amp IC such as an LM324 operating from a single sided supply voltage. The "OR" function generator 112 can be provided by two diodes and the level adjusters 113 and 114 can be provided by current limiting resistors of the proper values. The level adjusters 113 and 114 select a proportion of red and green to provide Yellow when both are illuminated.

FIG. 4 is a circuit diagram of circuitry implementing the principle shown in the block diagram of FIG. 3. Here an inexpensive thermistor with a negative temperature coefficient is employed as the temperature sensor. The relationship between temperature and resistance in a sensor of this type can be approximated by $$T = a_0 + a_1 * \log R_T + a_3 * (\log R_T)^3$$

where
$R_T$ is the resistance of the sensor at temperature T and $a_i$ are parameters of the sensor selected.
The term $a_3 * (\log R_T)^3$ is small and the resistance can be approximated as $$R_T = 10^{(T/a1 - a0/a1)}$$

$R_1$ and $R_T$ are configured as a voltage divider across the supply voltage $E_S$ such that the voltage across $R_T$ is $$\frac{R_T}{R_1 + R_T} * E_S$$

U1a is one-fourth of a quad op-amp IC, such as an LM324, capable of operating with a single sided supply voltage. U1a is configured as a non-inverting amplifier to bring the voltage across $R_T$, within the range of temperatures of interest, to a sufficient level. The gain is $1 + R_3 / R_2$ such that the output of the sensor to voltage converter 102 is $$E_T = \frac{R_T}{R_1 + R_T} * \left[1 + \frac{R_3}{R_2}\right] * E_S$$

$R_1$ is chosen to be much larger than the maximum resistance of the sensor within the range of temperatures to be monitored such that $E_T$ can be approximated by $$E_T = \frac{R_T}{R_1} * \left[1 + \frac{R_3}{R_2}\right] * E_S$$

or $$E_T = \frac{10^{(T/a1 - a0/a1)}}{R1} * \left[1 + \frac{R_3}{R_2}\right] * E_S$$

Thus, for $a_I < 0$ in the case of the thermistor with negative temperature coefficient, $E_T$ is monotonically decreasing with temperature and directly proportional to the supply voltage.

Also, for a constant difference in temperature, $T_2 - T_1$, the ratio of $E_{T2}/E_{T1}$ is a constant given by $$\frac{E_{T2}}{E_{T1}} = 10^{1/a1 * (T2 - T1)}$$

Thus, the voltage divider 104 produces an output that represents a constant difference in temperature from the output of the variable voltage divider 103.

Resistors $R_4$, $R_5$ and $R_6$ form the variable voltage divider 103 and $R_7$ and $R_8$ the voltage divider 104. Because $E_T$ decreases as the temperature increases the lower temperature limit, $E_C$, is taken from the variable voltage divider 103 and the higher temperature limit, $E_H$, from the voltage divider 104. The outputs from 103 and 104 are $$E_C = \frac{[((1 - \alpha) * R_5 + R_6) | | (R_7 + R_8)]}{R_4 + \alpha * R_5 + [((1 - \alpha) * R_5 + R_6) | | (R_7 + R_8)]} * E_S$$

and $$E_H = \frac{R_7}{R_7 + R_8} * E_C$$

where $R_x | R_y$ denotes the parallel resistance of $R_x$ and $R_y$.
$\alpha$ varies linearly from 0 to 1 as $R_5$ is adjusted.
Thus, $E_C$ and $E_H$ are directly proportional to the supply voltage and the constant ratio between them represents a nearly constant difference in temperature.
U1d is one-fourth of the IC and is configured as a comparator such that the output is high when $$E_T > E_H \text{ or } T < T_H$$

This illuminates the green indicator thru the current limiter resistor R$_9$ when the temperature is less than the high end of the range selected.

U1c is one-fourth of the IC and is configured as a comparator such that the output is high when $$E_T < E_H \text{ or } T > T_H$$

and U1b is one-fourth of the IC and is configured as a comparator such that the output is high when $$E_T > E_C \text{ or } T < T_C$$

The outputs of U1b and U1c are "OR-ed" together via diodes D$_1$ and D$_2$ and illuminate the red indicator through the current limiter resistor R$_{10}$. The ratio of R$_9$ and R$_{10}$ is set to produce a yellow color when both red and green are illuminated.

In summary, the indicators are illuminated under the following conditions:

red alone $= E_T < E_H$ or $T > T_H$
green alone $= E_H < E_T < E_C$ or $T_C < T < T_H$
red and green (yellow) $= E_T > E_C$ or $T < T_C$ The result is that the indicators show yellow when the temperature being monitored is less than the low end of the temperature range selected, green when the temperature is within the range and red when above the range.

Figure 5:
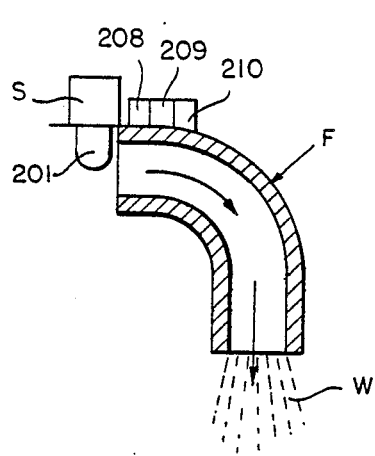
FIG. 5 schematically depicts another preferred embodiment of the present invention, with the temperature monitoring system incorporated into a water faucet fixture.

FIG. 5 schematically depicts a preferred embodiment with the temperature monitoring system incorporated under factory conditions in a faucet assembly The temperature probe 201 protrudes into the downstream side of the faucet valve and the visual indicator lights 208, 209, 210, corresponding to lights 8, 9, 10 in the other preferred embodiments, are disposed so as to be readily viewable by an operator of the faucet assembly F. S schematically depicts the indicator control circuitry system, which corresponds to the above-described circuits in conjunction with FIGS. 1 to 4.

Figure 6:
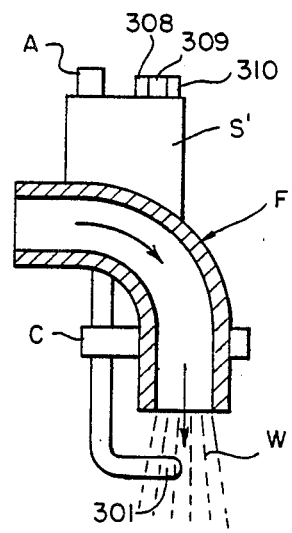
FIG. 6 is a schematic illustration of yet another embodiment of the present invention, wherein the temperature monitoring system is constructed as a separate detachable unit with attaching bracket clamp for attaching to an existing water faucet fixture.

FIG. 6 schematically depicts another preferred embodiment of the invention which is detachably constructed, but includes a clamping assembly C for clamping the same in a position on a plumbing fixture such as a water faucet as shown. The temperature probe 301 corresponds to the probe 1 of FIG. 1, the indicator lights 308, 309, 310 correspond to the lights 8, 9, 10 of FIG. 1. A indicates an adjustment knob for adjusting the sensitivity of the system and S' schematically depicts the system circuitry, the same being according to one of the embodiments described above with respect to FIGS. 1 to 4. This arrangement has the advantage of facilitating a retrofit to existing plumbing systems.

Also, the temperature of different fluid mediums can be monitored using preferred embodiments of the invention, such as air temperature in a sauna or steam bath or the temperature of other liquids.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A temperature monitoring arrangement comprising:
    desired temperature selection means including an adjustable variable voltage divider for selecting a desired temperature range for a fluid medium, temperature detecting means for detecting whether the fluid medium temperature is above, below or at the desired temperature range,
    and temperature indicating means for emitting three different temperature indicating signals indicating whether the fluid temperature is respectively above, below or at the desired temperature range.

2. A temperature monitoring arrangement according to claim 1, wherein the temperature detecting and indicating means include electrical circuit means with a supply voltage, said electrical circuit means assuring accurate temperature detecting and indicating irrespective of the supply voltage level as long as said supply voltage is above a predetermined minimum voltage level.

3. A temperature monitoring arrangement according to claim 2, wherein said temperature indicating means includes different color light emitting signal means for the three respective fluid medium temperature conditions of above, below or at the desired temperature range conditions.

4. A temperature monitoring arrangement according to claim 3, wherein said light signal means includes three different light emitting diodes which are selectively turned on by the circuit means as a function of the fluid medium temperature.

5. A temperature monitoring arrangement according to claim 4, wherein said three different light emitting diodes includes a yellow light emitting diode for indicating a fluid medium temperature below the desired temperature range, a red light emitting diode for indicating a fluid medium temperature above the desired temperature range, and a green light emitting diode for indicating a fluid medium temperature at the desired temperature range.

6. A temperature monitoring arrangement according to claim 3, wherein said light signal means includes a red and a green light emitting diode housed in a common housing with a common window "CW", and wherein said circuit means includes means to activate only said green light emitting diode when the temperature is at the desired temperature range, means to activate only red light emitting diode when the temperature is above the desired temperature range, and means for actuating both the green and red light emitting diodes to combine to form a yellow indicating signal when the temperature is below the desired temperature range.

7. A temperature monitoring arrangement according to claim 1, wherein said temperature indicating means includes different color light emitting signal means for the three respective fluid medium temperature conditions of above, below or at the desired temperature range conditions.

8. A temperature monitoring arrangement according to claim 7, wherein said light signal means includes three different light emitting diodes which are selectively turned on by the circuit means as a function of the fluid medium temperature.

9. A temperature monitoring arrangement according to claim 8, wherein said three different light emitting diodes includes a yellow light emitting diode for indicating a fluid medium temperature below the desired temperature range, a red light emitting diode for indicating a fluid medium temperature above the desired temperature range, and a green light emitting diode for indicating a fluid medium temperature at the desired temperature range.

10. A temperature monitoring arrangement according to claim 8, further comprising automatic shut-off means for automatically shutting off the electric current supply to the light emitting diodes when the detected temperature is lower than the lower limit of the desired temperature by a predetermined amount.

11. A temperature monitoring arrangement according to claim 10, wherein said automatic shut-off means is operated whenever the detected temperature is more than 15° F. below the lower limit of the desired temperature range.

12. A temperature monitoring arrangement according to claim 7, wherein said light signal means includes a red and a green light emitting diode housed in a common housing with a common window, and wherein said circuit means includes means to activate only said green light emitting diode when the temperature is at the desired temperature range, means to activate only said red light emitting diode when the temperature is above the desired temperature range, and means for actuating both the green and red light emitting diodes to combine to form a yellow indicating signal when the temperature is below the desired temperature range.

13. A temperature monitoring arrangement according to claim 1, wherein said desired temperature selection means, said temperature detecting means, and temperature indicating means are contained in a compact manually graspable container.

14. A temperature monitoring arrangement according to claim 1, further comprising detachable attachment means for detachably attaching the monitor arrangement to a water faucet or the like.

15. A temperature monitoring arrangement according to claim 14, wherein said attachment means includes clip means engageable with a water faucet exterior surface and adjustable means engageable between the water faucet surface and the clip means to forceably clamp the clip means to the water faucet with a probe of the temperature detecting means disposed to be in the stream of water from the faucet when the faucet is turned on.

16. A temperature monitoring arrangement according to claim 1, wherein said desired temperature selection means, said temperature detecting means, and temperature indicating means are assembled together with a fluid faucet fixture with a probe of the temperature indicating means positioned in the fixture to be contacted by fluid in the faucet fixture.

17. A temperature monitoring arrangement according to claim 16, wherein said probe is positioned downstream of a valve of the faucet fixutre.

18. A temperature monitoring arrangement according to claim 17, wherein said temperature indicating means is disposed on the faucet fixture adjacent a manually operable handle of the faucet fixture.

19. A temperature monitoring arrangement comprising:
a temperature sensor selectively positionable in a medium at a medium temperature monitoring location,
a temperature sensing voltage converter for producing a temperature indicating voltage that varies with variation in the temperature sensed by the temperature sensor,
an adjustable variable voltage divider for producing a reference low temperature limit voltage corresponding to a predetermined desired lower temperature limit of the temperature,
voltage supply means for supplying a supply voltage to the temperature sensing voltage converter and variable voltage divider such that both the temperature sensing voltage and reference low temperature limit voltage are directly proportional to the supply voltage,
a second voltage divider for producing a desired high temperature limit voltage which is proportional to the reference low temperature limit voltage and corresponds to a predetermined upper limit of the temperature,
a high temperature indicator;
a low temperature indicator,
an acceptable temperature indicator, and
voltage comparator means for comparing the temperature indicating voltage, the high temperature limit voltage and the low temperature limit voltage and for generating respective indicator actuating signals for actuating the high temperature indicator whenever the temperature indicating voltage indicates a temperature above the high temperature limit represented by the high temperature limit voltage, for actuating the low temperature indicator whenever the temperature indicating voltage indicates a temperature below the low temperature limit represented by the low temperature limit voltage, and for actuating the acceptable temperature indicator whenever the temperature indicating voltage is between the low temperature limit voltage and the high temperature limit voltage.

20. A temperature monitoring arrangement according to claim 19, wherein said voltage comparator means includes:
a first level comparator for comparing the temperature indicating voltage and the reference high temperature limit voltage and for generating a signal to actuate the high temperature indicator when the temperature indicating voltage indicates a temperature greater than the high temperature limit represented by the high temperature limit voltage,
a window comparator for comparing the temperature indicating voltage with both the high temperature limit voltage and the low temperature limit voltage and for generating a signal to actuate the acceptable temperature indicator when the temperature indicating voltage is between the low temperature limit voltage and the high temperature limit voltage,
and a second level comparator for comparing the temperature indicating voltage and the low temperature limit voltage and for generating a signal to actuate the low temperature indicator when the temperature indicating voltage indicates a temperature below the low temperature limit represented by the low temperature limit voltage.

21. A temperature monitoring arrangement according to claim 19, wherein the high temperature indicator is a red light, wherein the low temperature indicator is an amber light, and wherein the acceptable temperature indicator is a green light.

22. A temperature monitoring arrangement according to claim 21, wherein each of the lights are constructed as respective light emitting diodes with current limiting resistors.

23. A temperature monitoring arrangement according to claim 19, wherein the temperature sensing voltage converter consists of one operating amplifier and three resistors.

24. A temperature monitoring arrangement according to claim 19, wherein the voltage comparator means comprises:
a first level comparator for comparing the temperature indicating voltage and the reference high temperature limit voltage and for generating a first indicator output signal when the temperature indicating voltage indicates a temperature higher than the high temperature limit represented by the high temperature limit voltage,
a second level comparator for comparing the temperature indicating voltage and the high temperature limit voltage and for generating a second indicator output signal when the temperature indicating voltage indicates a temperature lower than the high temperature limit represented by the high temperature limit voltage, and
a third level comparator for comparing the temperature indicating voltage and the low temperature limit voltage and for generating a third indicator output signal when the temperature indicating voltage indicates a temperature lower than the low temperature limit represented by the low temperature limit voltage.

* * * * *